United States Patent (10) Patent No.: US 9,628,620 B1
Rae et al. (45) Date of Patent: Apr. 18, 2017

(54) METHOD AND SYSTEM FOR PROVIDING CAPTIONED TELEPHONE SERVICE WITH AUTOMATED SPEECH RECOGNITION

(71) Applicant: ClearCaptions, LLC, Rocklin, CA (US)

(72) Inventors: Robert Lee Rae, Granite Bay, CA (US); Blaine Michael Reeve, Folsom, CA (US)

(73) Assignee: ClearCaptions, LLC, Rocklin, CA (US)

( * ) Notice: Subject to any disclaimer, the term of this patent is extended or adjusted under 35 U.S.C. 154(b) by 0 days.

(21) Appl. No.: 15/204,072

(22) Filed: Jul. 7, 2016

(51) Int. Cl.
*H04M 11/00* (2006.01)
*G10L 21/00* (2013.01)
*G10L 21/06* (2013.01)
*G10L 25/00* (2013.01)
*H04M 3/42* (2006.01)
*H04M 11/06* (2006.01)
*H04M 7/00* (2006.01)
*G10L 15/26* (2006.01)
*G10L 21/10* (2013.01)
*G10L 15/01* (2013.01)
*G10L 15/22* (2006.01)

(52) U.S. Cl.
CPC ......... *H04M 3/42391* (2013.01); *G10L 15/01* (2013.01); *G10L 15/22* (2013.01); *G10L 15/26* (2013.01); *G10L 21/10* (2013.01); *H04M 7/006* (2013.01); *H04M 11/066* (2013.01); *H04M 2201/40* (2013.01)

(58) Field of Classification Search
CPC ............ H04M 1/2475; H04M 1/7255; H04M 1/72591; H04M 2250/74; G06F 17/27; G06F 17/18; G10L 15/08; G10L 15/26; G10L 15/148; G10L 15/265; G10L 15/285; G10L 19/038; G10L 2019/0005; G10L 21/055; G10L 21/06; G10L 13/08; H04N 21/233; H04N 21/23418; H04N 21/26603
USPC ..... 379/52, 265.01, 309; 704/231, 237, 240, 704/243, 246, 270, 270.1, 271
See application file for complete search history.

(56) References Cited

U.S. PATENT DOCUMENTS 8,843,368 B2 * 9/2014 Kim ...................... G10L 15/265
704/231
9,305,552 B2 * 4/2016 Kim ...................... G10L 15/265
9,396,180 B1 * 7/2016 Salvador ............... H04N 21/233
9,495,964 B2 * 11/2016 Kim ...................... G10L 15/265
(Continued)

*Primary Examiner* — Binh Tieu
(74) *Attorney, Agent, or Firm* — Scheinberg & Associates, P.C.; John B. Kelly

(57) ABSTRACT

Embodiments of the present invention are directed to methods for providing captioned telephone service. One method includes initiating a first captioned telephone service call. During the first captioned telephone service call, a first set of captions is created using a human captioner. Simultaneous with creating the first set of captions using a human captioner, a second set of captions is created using an automated speech recognition captioner. The first set of captions and the second set of captions are compared using a scoring algorithm. In response to the score of second set of captions being within predetermined range of scores, the call is continued using only the automated speech recognition captioner. In response to the score of second set of captions being outside of a predetermined range of scores, the call is continued using a human captioner.

20 Claims, 5 Drawing Sheets

(56) References Cited

U.S. PATENT DOCUMENTS

| | | | |
|---|---|---|---|
| 2011/0040559 A1* | 2/2011 | Kim | G10L 15/265 |
| | | | 704/231 |
| 2015/0046160 A1* | 2/2015 | Kim | G10L 15/265 |
| | | | 704/235 |
| 2015/0341486 A1* | 11/2015 | Knighton | H04W 4/16 |
| | | | 455/414.1 |
| 2015/0371631 A1* | 12/2015 | Weinstein | G10L 15/08 |
| | | | 704/256.4 |
| 2016/0198234 A1* | 7/2016 | Kim | G10L 15/265 |
| | | | 704/253 |

* cited by examiner

METHOD AND SYSTEM FOR PROVIDING CAPTIONED TELEPHONE SERVICE WITH AUTOMATED SPEECH RECOGNITION

TECHNICAL FIELD OF THE INVENTION

The present invention relates to telecommunications services for callers who are deaf, hard-of-hearing, or speech impaired, and in particular to captioned telephone service.

BACKGROUND OF THE INVENTION

Traditional telephony presents a problem for persons who are who are deaf, hard of hearing, or speech-impaired (D-HOH-SI). Communication by telephone requires each party to a telephone call to be able to hear and/or speak to the other party on the call to communicate. For hearing or speech impaired persons, audio communication is difficult or impossible, making telephone communication difficult or impossible.

Early approaches to facilitating telecommunications for D-HOH-SI persons included text-based telecommunications relay service (TRS). Text-based TRS services allow a D-HOH-SI person to communicate with other people over an existing telecommunications network using devices capable of transmitting and receiving text characters over the telecommunications network. Such devices include the telecommunications device for the deaf (TDD) and the teletypewriter (TTY). Text-based TRS services were well-suited to the bandwidth limitations of subscriber lines of the time. The bandwidth limitations of subscriber lines were also a limiting factor in the widespread use of video telephony.

The availability of affordable, high-speed packet-switched communications has led to the growth in the use of video relay services (VRS) by D-HOH-SI persons. Using VRS equipment, D-HOH-SI persons can place video calls to communicate between themselves and with hearing individuals using sign language. VRS equipment enables D-HOH-SI persons to talk to Hearing individuals via a sign language interpreter, who uses a conventional telephone at the same time to communicate with the party or parties with whom the D-HOH-SI person wants to communicate. The interpretation flow is normally within the same principal language, such as American Sign Language (ASL) to spoken English or spoken Spanish.

While VRS is a useful service for people who rely on sign language to communicate, captioned telephone service can be used by people who can use their own voice to speak but need assistance to hear what is being said to them on the other end of a telephone call. Captioned telephone service is a telecommunication service that enables people who are hard of hearing, oral deaf, or late-deafened to speak directly to another party on a telephone call. Typically, a telephone displays substantially in real-time captions of what the hearing party speaks during a conversation. The captions are displayed on a screen embedded in the telephone base. Captioned telephone services can be provided in traditional telephone environments as well as in voice-over-internet-protocol (VOIP) environments.

Initially, captioned telephone service was only available to people in states that had captioned telephone service as part of their state relay program. The FCC made internet protocol caption telephone service (IP-CTS) a part of the federally mandated services under the TRS fund. IP-CTS requires an internet connection to deliver the captions to the user. Most users also rely on their regular land-line telephone for the audio portion of the call, but some configurations of IP-CTS allow the use of VOIP to carry the call audio. IP-CTS has allowed captioned telephone service to be provided on smartphones and tablets.

IP-CTS is a relatively new industry that is growing extremely fast. IP-CTS has services paid for by the FCC's TRS fund and delivered by private companies, such as ClearCaptions, LLC, assignee of the present application. IP-CTS is particularly useful to anyone who can use their own voice to speak but who needs assistance to hear or understand what is being said by the other end of the call.

To reduce the costs associated with operating a call center with human captioners for IP-CTS, automated speech recognition (ASR) software is an alternative that can be used to deliver a caption stream in real-time to a user across the user's telephone, computer, tablet or table-top phone. ASR software does not have a human element so the costs of operating a call-center with human captioners can be reduced or eliminated. However, an issue with using ASR exclusively (i.e., without a human captioner) for IP-CTS is that ASR is only as good as its ability to understand the speech of a particular individual and accurately generate captions for each and every individual using the service. Because not everyone talks the same way, ASR may not work to caption everyone with an acceptable level of accuracy (i.e., ASR would work with sufficient accuracy for some people's voices, but not for others). What is needed is a way to provide accurate captioned telephone service using automated speech recognition assisted by human captioning.

SUMMARY OF THE INVENTION

Embodiments of the present invention are directed to a method for providing captioned telephone service. The method includes initiating a first captioned telephone service call. During the first captioned telephone service call, a first set of captions is created using a human captioner. Simultaneous with creating the first set of captions using a human captioner, a second set of captions is created using an automated speech recognition captioner. The first set of captions and the second set of captions are compared using a scoring algorithm. In response to the score of second set of captions being within predetermined range of scores, the call is continued using only the automated speech recognition captioner. In response to the score of second set of captions being outside of a predetermined range of scores, the call is continued using a human captioner.

Alternative embodiments of the present invention are directed to another method for providing captioned telephone service. The method includes initiating a first captioned telephone service call. Using an automated speech recognition captioner, captions are created based on words spoken by a first party to the first captioned telephone service call. The captions are displayed to a second party to the first captioned telephone service call. The accuracy of the captions are measured with respect to the words spoken by the first party. In response to the accuracy of the captions being within predetermined accuracy range, the creation of captions using automated speech recognition is continued. In response to the accuracy of the captions being outside of a predetermined accuracy range, captions for the remainder of the captioned telephone service call are created using a human captioner.

Alternative embodiments of the present invention are directed to another method for providing captioned telephone service. The method includes initiating a first captioned telephone service call. During the first captioned telephone service call, a first set of captions is created using a human captioner. Simultaneous with creating the first set of captions using a human captioner, a second set of captions is created using an automated speech recognition captioner. The first set of captions and the second set of captions are compared using a scoring algorithm. A determination is made as to whether the first set of captions is outside of a predetermined range of scores. In response to the score of first set of captions being outside of a predetermined range of scores, an electronic flag is set, the flag being indicative of the human captioner being in need of corrective action.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1:
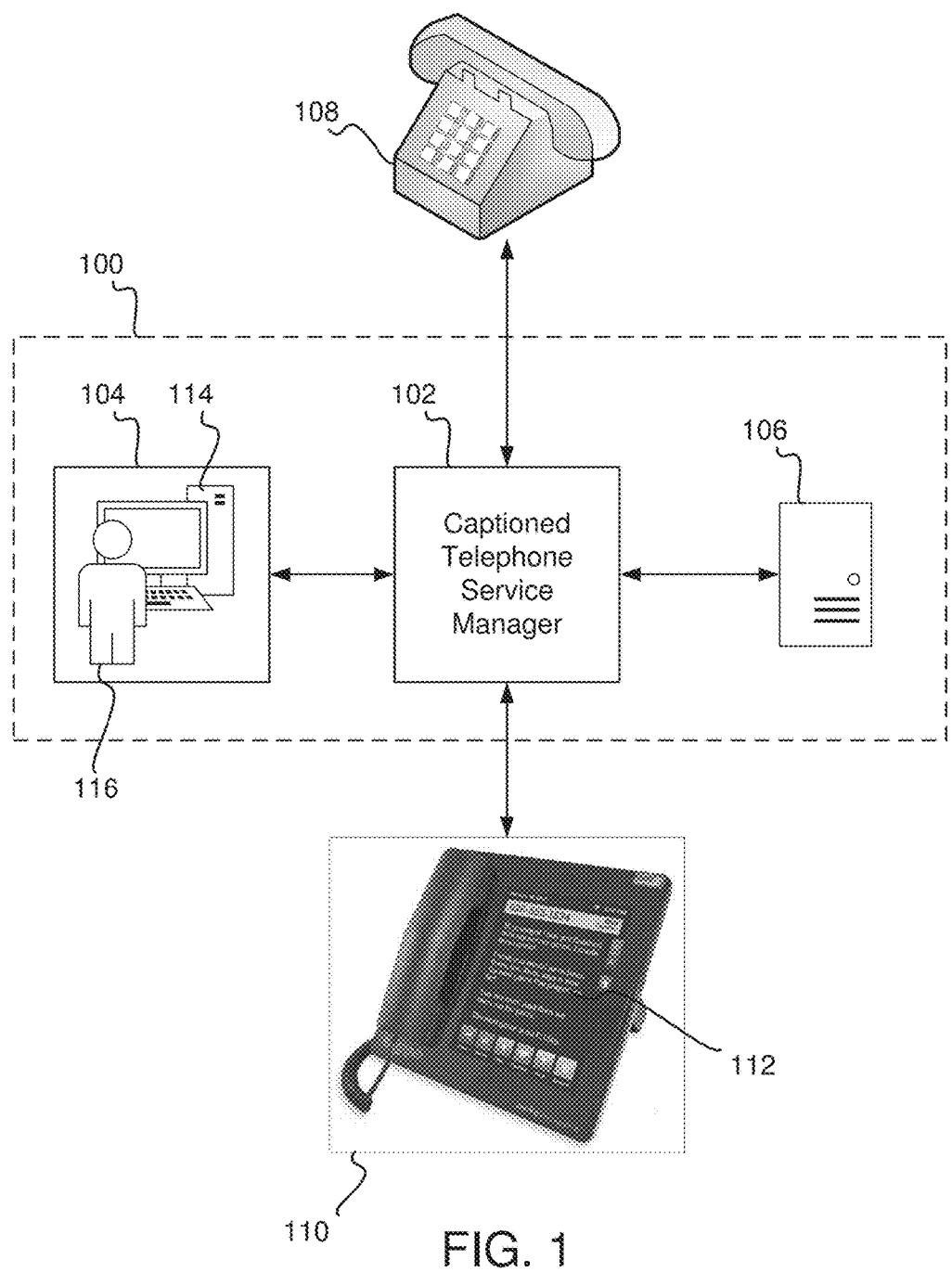
FIG. 1 is a diagram of an exemplary captioned telephone service (CTS) system 100 suited for implementing embodiments of the present invention.

Embodiments of the present invention are directed to improved methods and systems for providing captioned telephone service (CTS), including internet protocol caption telephone service (IP-CTS). Embodiments of the present invention are further directed to methods and systems for providing accurate captioned telephone service using automated speech recognition assisted by human captioning. In an exemplary embodiment, an automated software recognition (ASR) software-based captioner is run alongside a live, human captioner for a short period of time. The accuracy level of the two sets of captions is compared to determine whether the party being captioned is someone for whom ASR is an acceptable service. If the accuracy of ASR captioning is acceptable, then the human captioner's stream is cut off and the ASR captioner takes the call forward. If the ASR stream is below some threshold (or significantly worse that the human captioner), then the ASR captioner cuts off and the human captioner handles captioning for the rest of the call.

Embodiments of the present invention are further directed to creating captions with a live, human captioner and an ASR technology at the same time, comparing the captioning from both sources in real time via a scoring algorithm, and making a decision to continue the call with the ASR technology only if the ASR reaches an acceptable level of ongoing success, as determined, for example, by a service level agreement (SLA).

Embodiments of the present invention are directed to storing performance statistics in a database of telephone numbers and/or other individual identifiers that will enable the ASR probability of success decision to be made at the beginning of the call in future versus starting the call with a human captioner. This could include the score across various ASR choices if more than one ASR engine is employed. Stored scoring can also be used to speed the decision. Stored scoring can also be used in conjunction with algorithm calculations of the current call to speed the decision or decide whether to continue to retest during the call and how often retesting should occur.

Embodiments of the present invention are directed to routing calls to human captioners or ASR technology based on past call history.

Embodiments of the present invention are directed to applying different ASR technologies in future calls based on historical performance of various ASR technologies for that individual.

Embodiments of the present invention are directed to a sequential test for accuracy—first, the ASR stream starts and is measured for accuracy, then it kicks automatically to a human captioner if the ASR captioner not hitting an established accuracy target.

Embodiments of the present invention are directed to evaluating the voice of the party being captioned by a technology that will indicate whether the party's voice will be able to be captioned successfully, for example, a probability-based evaluation. For example, if a person speaks a language (e.g., a creole or pidgin language) which is known to cause a particular ASR captioner to produce captions with insufficient accuracy, the system will switch the call immediately to a human captioner. Other tests can be used in addition to comparisons of the human captioner to the ASR captioner. Other tests could include, for example, volume or noise level detection, static detection, echo, etc., to flag that a call will probably need help due to poor audio quality. Geographic data, such as the TN location of the other party, can be used to flag geographical or demographic needs to utilize a human captioner.

FIG. 1 is a diagram of an exemplary captioned telephone service (CTS) system 100 suited for implementing embodiments of the present invention. Telephone 108 is communicatively coupled to captioned telephone service manager 102. Telephone 108 can be, but is not limited to, a traditional telephone connected to the public switched telephone network (PSTN), a cellular telephone connected to a cellular telephony network, a voice-over-internet-protocol (VOIP) device connected to an internet protocol (IP) network, or a telephony application executing on a network-connected computing device, such as a smartphone, tablet computer, or personal computer (PC). Communicatively coupled, as used herein, refers to communications devices connected by means for sending and receiving voice and/or data communications over wired and wireless communication channels, including, but not limited to, PSTN, cellular telephony networks, private branch exchanges (PBX), and packet switched IP networks.

Captioned telephone service (CTS) manager 102 is communicatively coupled to telephone 108, human captioner 104, automated speech recognition (ASR) captioner 106, and telephone 110. CTS manager 102 manages the communications between telephone 108, human captioner 104, automated speech recognition (ASR) captioner 106, and telephone 110. CTS manager 102 includes the logic, described in further detail below, for generating captions. CTS manager 102 can comprise a discrete electronic component, as shown in FIG. 1. Alternatively, CTS manager 102 can comprise software hosted in one or more of the devices of CTS system 100. Alternatively, CTS manager 102 can comprise a software service hosted on a networked cloud-based server in a software-as-a-service (SaaS) configuration.

Human captioner 104 can comprise a human operator 116 and a computer workstation 114. Human operator 116 can listen to the party speaking via telephone 108. Human operator 116 can use computer workstation 114 to create captions of the words spoken by the party speaking via telephone 108. Human operator 116 can create captions by repeating the words spoken into telephone 108 by the party using telephone into an automated speech recognition engine executing on computer workstation 114. The automated speech recognition engine executing on computer workstation 114 is trained to recognize speech from human operator 116 and generate text captions based on the speech of human operator 116. The generated text captions are transmitted to telephone 110 by CTS manager 102. Human operator 116 can alternatively create captions by manually transcribing the words spoken into telephone 108 into written text that is transmitted to telephone 110 by CTS manager 102. Human operator 116 can also use computer workstation 114 to edit the ASR generated captions as necessary to correct errors. Telephone 110 includes display 112 adapted for displaying captions received from CTS manager 102. While FIG. 1 shows telephone 110 as a caption-enabled telephony device, telephone 110 could also comprise software application running on a smartphone, tablet, or PC, that is capable of providing captioned telephone service.

ASR captioner 106 can generate captions directly from the speech of the party using telephone 108. A human operator is not needed to generate captions. The automated speech recognition engine executing on computer workstation 114 differs from ASR captioner 106 in that the automated speech recognition engine executing on computer workstation 114 is trained to recognize speech from human operator 116 and human operator 116 is required for human captioner 104 to generate captions.

Figure 2:
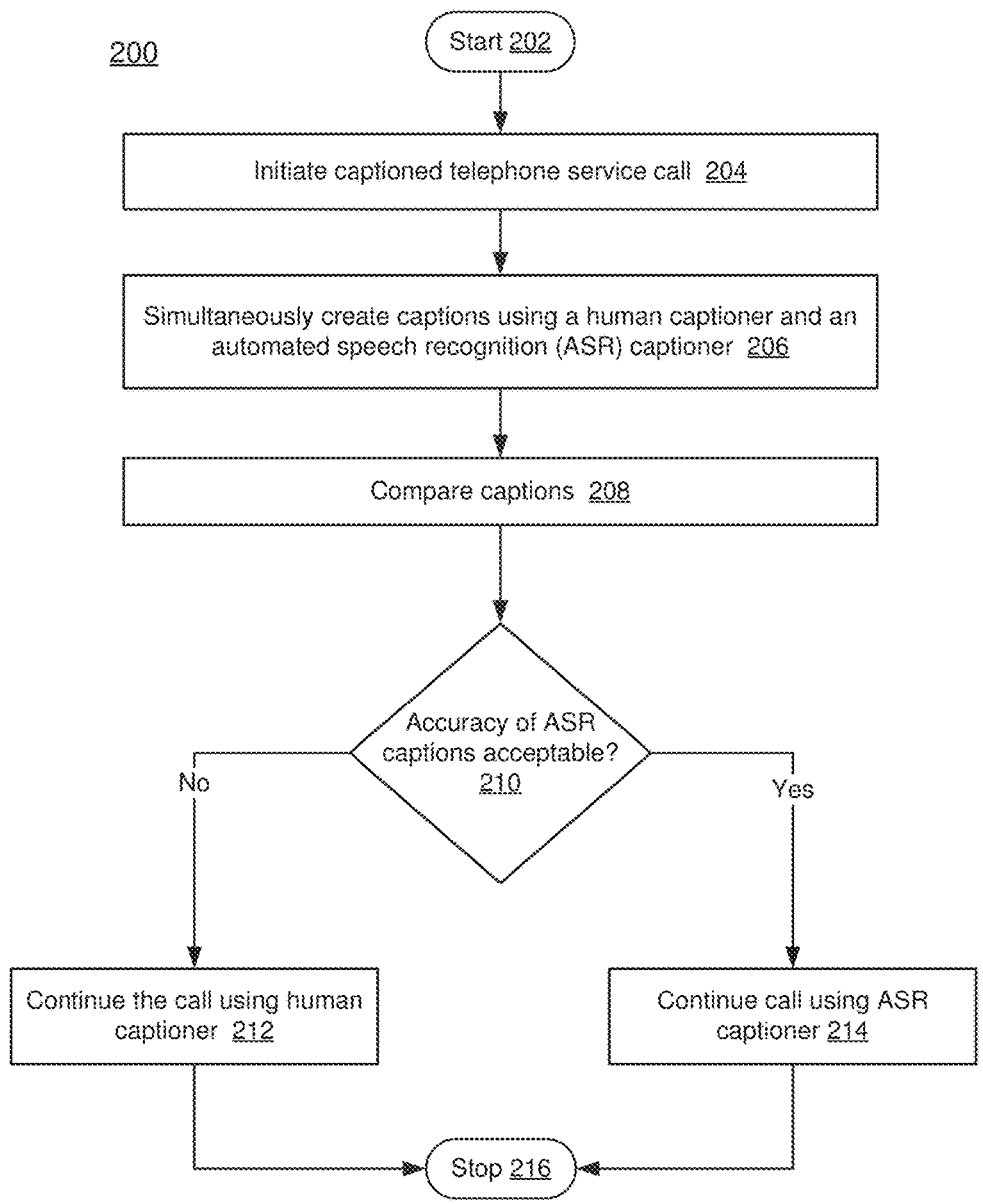
FIG. 2 is a flowchart of an exemplary method 200 for providing captioned telephone service (CTS) in accordance with one or more embodiments of the present invention.

FIG. 2 is a flowchart of an exemplary method 200 for providing captioned telephone service (CTS) in accordance with one or more embodiments of the present invention. The method starts at step 202. At step 204, a captioned telephone service call is initiated. For example, a person without hearing loss uses telephone 108 to call a person who has some degree of hearing loss for which captioning would be a benefit or necessity for the telephone conversation. In another example, both parties to the call have hearing loss and captions are generated based on the words spoken by each party. The generated captions are then displayed on the telephone of the non-speaking party.

At step 206, captions of the spoken words are created substantially in real-time using human captioner 104. At the same time captions are being created using human captioner 104, captions of the same spoken words are also created substantially in real-time using ASR captioner 106. That is, two sets of captions of the same spoken words are simultaneously created by human captioner 104 and ASR captioner 106, substantially in real-time. A first set of captions is created by human captioner 104. A second set of captions is created by ASR captioner 106. The captions created at step 206 by human captioner 104 are transmitted for display on telephone 110.

At step 208, the captions created using human captioner 104 are compared to the captions created using ASR captioner 106. That is, the set of captions created by ASR captioner 106 is compared to the set of captions created by human captioner 104. The comparison can be made using a scoring algorithm. The scoring algorithm assigns a score to the set of captions created by ASR captioner 106 based on the number of captions that are different from the set of captions created by human captioner 104. The set of captions created by human captioner 104 is presumed to be the more accurate set of captions because there is human oversight in the generation of the captions by human captioner 104.

At step 210, a determination is made as to whether the captions created by ASR captioner 106 are sufficiently accurate to continue the call without using human captioner 104. The determination can be made by CTS manager 102. The determination can be based on an acceptable level of accuracy as defined in a service level agreement (SLA). The determination can be made by determining differences between the set of captions created by ASR captioner 106 and the set of captions created by human captioner 104. If the differences between the two sets of captions are less than a predetermined threshold of differences, then the captions created by ASR captioner 106 are sufficiently accurate to continue the call without using human captioner 104. If the differences between the two sets of captions are greater than a predetermined threshold of differences, then the captions created by ASR captioner 106 are not sufficiently accurate to continue the call without using human captioner 104. If a scoring algorithm is used to make the comparison in step 208, then the accuracy determination can be made based on the score of the captions created by ASR captioner 106 being within a predetermined range of scores that are indicative of sufficient accuracy. If the score of the set of captions generated by ASR captioner 106 is within the predetermined ranges of scores, then the captions created by ASR captioner 106 are sufficiently accurate to continue the call without using human captioner 104. If the score of the set of captions generated by ASR captioner 106 is not within the predetermined ranges of scores, then the captions created by ASR captioner 106 are not sufficiently accurate to continue the call without using human captioner 104.

If the captions created by ASR captioner 106 are sufficiently accurate to continue the call without using human captioner 104, then the method proceeds to step 214. The call is continued without using human captioner 104. That is, the call is continued with captions being generated only by the ASR captioner 106. Continuing the call with captions being generated only by the ASR captioner 106 frees up human captioner 104 to service another CTS call. This reduces demand for human captioners 104 in a particular CTS provider's call center, enabling fewer human captioners 104 to service a greater number of calls.

If the captions created by ASR captioner 106 are not sufficiently accurate to continue the call without using human captioner 104, then the method proceeds to step 212. The call is continued using human captioner 104 to generate captions and the generation of captions from ASR captioner 106 can be discontinued. Continuing the call using human captioner 104 to generate captions ensures that the captions are within an acceptable level of accuracy in situations where the captions generated by the ASR captioner 106 are not sufficiently accurate (e.g., noisy line quality, quiet speaker, language or dialect not recognized, etc.). Alternatively, the generation of captions from ASR captioner 106 can be continued, and the accuracy continuously monitored.

Performance statistics can be stored in a database of telephone numbers and/or other identifiers. Performance statistics can include, but are not limited to, a percent word match between the ASR captioner and the human captioner, an average number of words not matched per minute of call audio, words per minute of call duration (which could strain either the ASR captioner or the human captioner), and a percent of time speaking versus dead air time on the call. Performance statistics can be used to make a probability of success determination with respect to using ASR captioner 106 at the beginning of the call instead of starting the call using human captioner 104. Such an embodiment is shown in FIG. 3.

Figure 3:
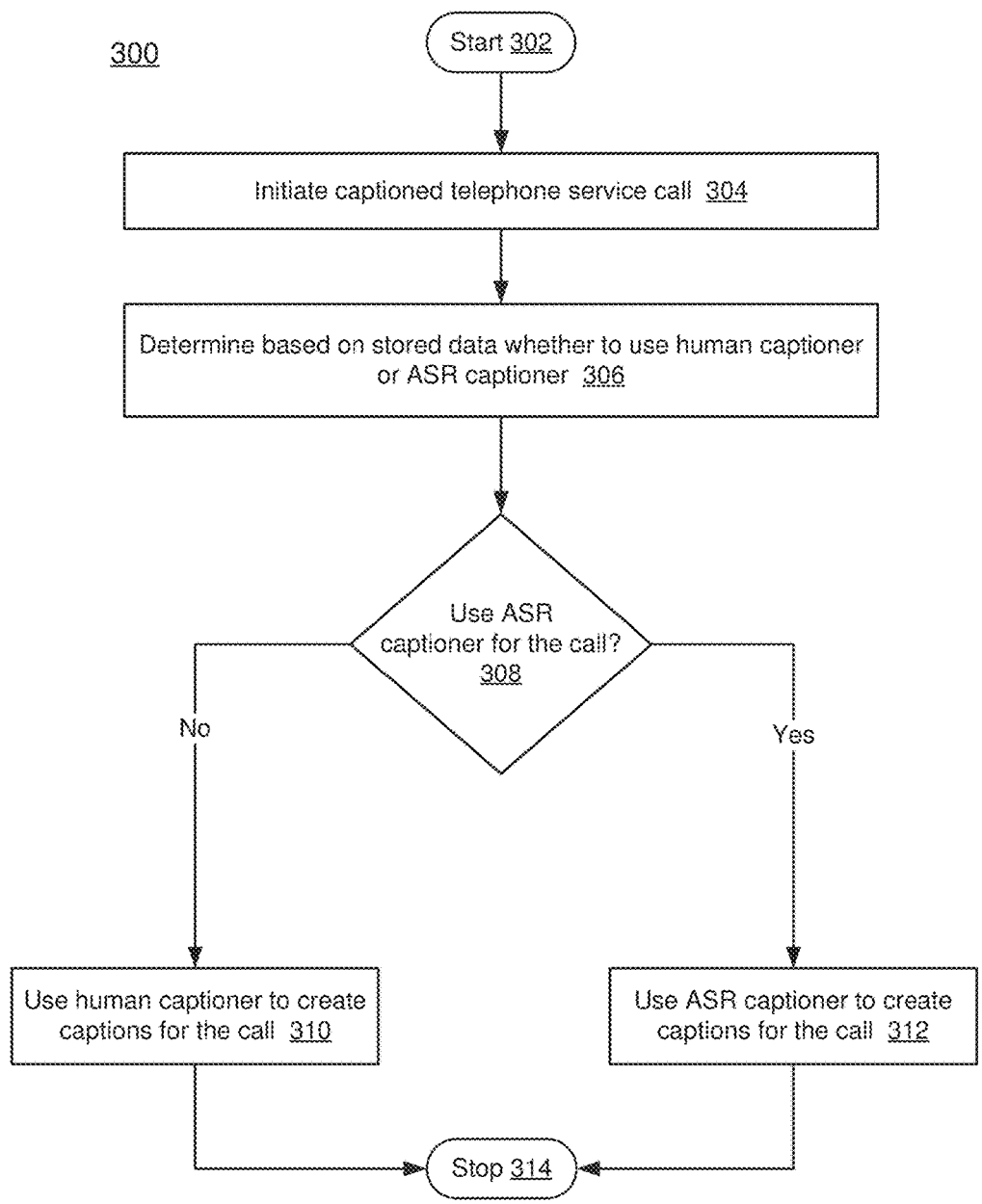
FIG. 3 is a flowchart of an exemplary method 300 for providing captioned telephone service (CTS) in accordance with one or more alternative embodiments of the present invention.

FIG. 3 is a flowchart of an exemplary method 300 for providing captioned telephone service (CTS) in accordance with one or more alternative embodiments of the present invention. The method starts at step 302. At step 304, a captioned telephone service call is initiated in a matter similar to the manner described with respect to step 204 of FIG. 2. At step 306, a determination is made based on stored data whether to use human captioner 104 or ASR captioner 106 to generate captions for the call. The determination can be made by CTS manager 102. Stored data can comprise performance statistics based on previous calls associated with a telephone number or other individual identifiers. Stored data can also be used to select among ASR captioners using different automated speech recognition technology. That is, if one ASR engine is known, based on historical performance, to produce better captions than other ASR engines used by the CTS service for a particular individual or telephone number, then that ASR engine can be selected as the ASR captioner 106.

At step 308, if the stored data indicates that ASR captioner 106 can be used to generate captions for the call, the method proceeds to step 312. At step 312, ASR captioner 106 is used to generate captions for the call. At step 308, if the stored data indicates that ASR captioner 106 can be used to generate captions for the call, the method proceeds to step 314. At step 314, human captioner 104 is used to generate captions for the call. Making the determination whether to use human captioner 104 before creating captions with human captioner 104 reduces the load on human captioners in a call center. That is, if stored data indicates in advance that ASR captioner 106 should be sufficiently accurate for the call, then human captioner 104 is not used for the call at all, enabling human captioner 104 to service calls for which a human captioner is needed.

Figure 4:
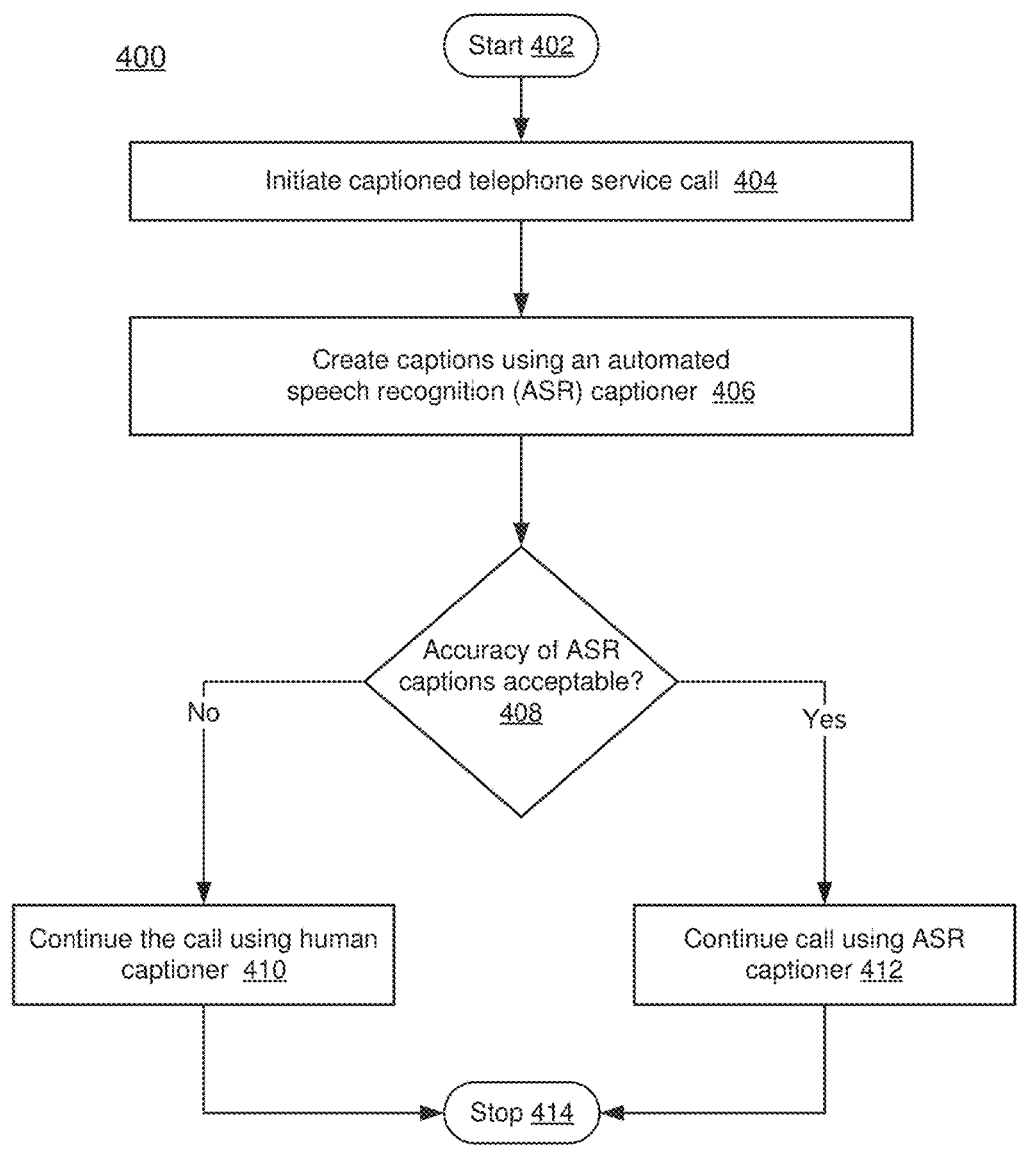
FIG. 4 is a flowchart of an exemplary method 400 for providing captioned telephone service (CTS) in accordance with one or more alternative embodiments of the present invention.

FIG. 4 is a flowchart of an exemplary method 400 for providing captioned telephone service (CTS) in accordance with one or more alternative embodiments of the present invention. The method starts at step 402. At step 404, a captioned telephone service call is initiated in a matter similar to the manner described with respect to step 204 of FIG. 2. At step 406, captions are created used ASR captioner 106. At step 408, it is determined whether the accuracy of the captions generated by ASR captioner 106 is sufficient to continue the call with ASR captioner 106. For example, the party to the call for whom captions are being created can be asked by CTS manager 102 at the beginning of the call to speak a predetermined set of words. ASR captioner 106 creates captions for the predetermined set of words. CTS manager 102 compares the captions created by ASR captioner 106 to the predetermined set of words and determines the accuracy of the captions created by ASR captioner 106. If the captions created by ASR captioner 106 are sufficiently accurate, then the method proceeds to step 412 and the call is continued using ASR captioner 106. If the captions created by ASR captioner 106 are not sufficiently accurate, then the method proceeds to step 410 and the call is continued using human captioner 104. Making the determination whether to use human captioner 104 before creating captions with human captioner 104 reduces the load on human captioners in a call center. That is, if it can be determined at the beginning of the call that ASR captioner 106 should be sufficiently accurate for the call, then human captioner 104 is not used for the call at all, enabling human captioner 104 to service calls for which a human captioner is needed.

Figure 5:
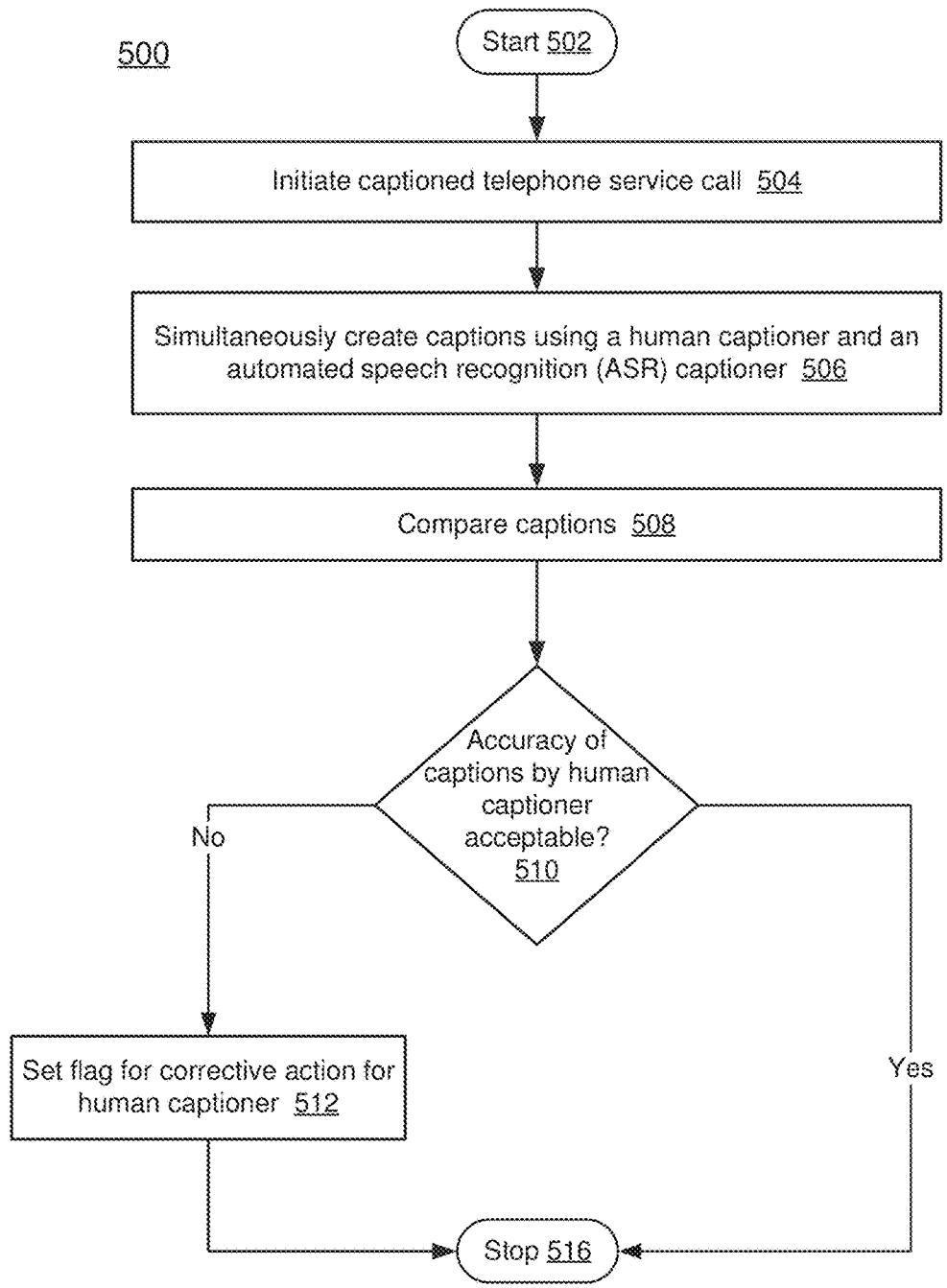
FIG. 5 is a flowchart of an exemplary method 500 for providing captioned telephone service (CTS) in accordance with one or more embodiments of the present invention.

FIG. 5 is a flowchart of an exemplary method 500 for providing captioned telephone service (CTS) in accordance with one or more embodiments of the present invention. The method starts at step 502. At step 504, a captioned telephone service call is initiated. For example, a person without hearing loss uses telephone 108 to call a person who has some degree of hearing loss for which captioning would be a benefit or necessity for the telephone conversation. In another example, both parties to the call have hearing loss and captions are generated based on the words spoken by each party. The generated captions are then displayed on the telephone of the non-speaking party.

At step 506, captions of the spoken words are created substantially in real-time using human captioner 104. At the same time captions are being created using human captioner 104, captions of the same spoken words are also created substantially in real-time using ASR captioner 106. That is, two sets of captions of the same spoken words are simultaneously created by human captioner 104 and ASR captioner 106, substantially in real-time. A first set of captions is created by human captioner 104. A second set of captions is created by ASR captioner 106. The captions created at step 206 by human captioner 104 are transmitted for display on telephone 110.

At step 508, the captions created using human captioner 104 are compared to the captions created using ASR captioner 106. That is, the set of captions created by ASR captioner 106 is compared to the set of captions created by human captioner 104. The comparison can be made using a scoring algorithm. The scoring algorithm assigns a score to the set of captions created by ASR captioner 106 based on the number of captions that are different from the set of captions created by human captioner 104. The set of captions created by human captioner 104 is presumed to be the more accurate set of captions because there is human oversight in the generation of the captions by human captioner 104.

At step 510, a determination is made as to whether the captions created by human captioner 104 are sufficiently accurate. The determination can be made by CTS manager 102. The determination can be based on an acceptable level of accuracy as defined in a service level agreement (SLA). The determination can be made by determining differences between the set of captions created by ASR captioner 106 and the set of captions created by human captioner 104. If the differences between the two sets of captions are less than a predetermined threshold of differences, then the captions created by human captioner 104 are sufficiently accurate such that human captioner 104 is not in need of corrective action. If the differences between the two sets of captions are greater than a predetermined threshold of differences, then the captions created by human captioner 104 are not sufficiently accurate and human captioner 104 is in need of corrective action. Corrective action can include additional training for human captioner 104. If a scoring algorithm is used to make the comparison in step 208, then the accuracy determination can be made based on the score of the captions created by human captioner 104 being within a predetermined range of scores that are indicative of sufficient accuracy. If the score of the set of captions generated by human captioner 104 is within the predetermined ranges of scores, then the captions created by human captioner 104 are sufficiently accurate to indicate that human captioner 104 is not in need of corrective action. If the score of the set of captions generated by human captioner 104 is not within the predetermined ranges of scores, then the captions created by human captioner 104 are not sufficiently accurate and human captioner 104 is in need of corrective action.

If the captions created by human captioner 104 are sufficiently accurate, then the method ends at 516. If the captions created by human captioner 104 are not sufficiently accurate then the method proceeds to step 512. At step 512, an electronic flag is set, for example by CTS manager 102. The electronic flag is indicative of human captioner 104 being in need of corrective action. Corrective action can include providing additional training to human captioner 104. Corrective action can include terminating the employment of human captioner 104. Corrective action can include placing human captioner 104 on a probation period. The probation period can be a period of time during which human captioner 104 must improve the accuracy of the captions he or she generates. When the electronic flag is set in step 512, an electronic communication can be sent, for example by CTS manager 102, to a person responsible for initiating the corrective action. The person responsible for initiating the corrective action can be a manager within the call center in which human captioner 104 works. The electronic communication can be in the form of an automated email, automated SMS message, or the like.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method for providing captioned telephone service, the method comprising:
    initiating a first captioned telephone service call;
    during the first captioned telephone service call, creating a first set of captions using a human captioner;
    simultaneous with creating the first set of captions using a human captioner, creating a second set of captions using an automated speech recognition captioner;
    comparing the first set of captions and the second set of captions using a scoring algorithm;
    in response to the score of second set of captions being within predetermined range of scores, continuing the call using only the automated speech recognition captioner; and
    in response to the score of second set of captions being outside of a predetermined range of scores, continuing the call using a human captioner.

2. The method of claim 1, further comprising storing performance statistics associated with the first captioned telephone service call in a database.

3. The method of claim 2, further comprising determining a probability of success of automated speech recognition captioning based on the stored performance statistics.

4. The method of claim 3, further comprising:
    initiating a second captioned telephone service call;
    routing the second captioned telephone service call to a human captioner if the probability of success of automated speech recognition is below a predetermined threshold for the call; and
    routing the second captioned telephone service call to an automated speech recognition captioner if the probability of success of automated speech recognition is above a predetermined threshold for the call.

5. The method of claim 4, in which the predetermined threshold is determined by a service level agreement.

6. The method of claim 1, in which the first captioned telephone service call is an internet protocol captioned telephone service (IP-CTS) call.

7. The method of claim 1, in which comparing the first set of captions and the second set of captions is performed substantially in real time during the first captioned telephone service call.

8. The method of claim 1, further comprising:
    storing data indicating whether the human captioner or the automated speech recognition captioner was used to complete the first call;
    initiating a second captioned telephone service call;
    retrieving the data indicating whether the human captioner or the automated speech recognition captioner was used to complete the first call; and
    using, on the second captioned telephone service call, the human captioner or the automated speech recognition captioner based on the stored data.

9. The method of claim 1, further comprising:
    storing data indicating one or more performance statistics of the first call;
    initiating a second captioned telephone service call;
    retrieving the data indicating one or more performance statistics of the first call; and
    using, on the second captioned telephone service call, the human captioner or the automated speech recognition captioner based on the stored data.

10. The method of claim 9, in which the data indicating one or more performance statistics of the first call includes a percent word match between the ASR captioner and the human captioner.

11. The method of claim 9, in which the data indicating one or more performance statistics of the first call includes an average number of words not matched per minute of call audio.

12. The method of claim 9, in which the data indicating one or more performance statistics of the first call includes a number of words per minute of call duration.

13. The method of claim 9, in which the data indicating one or more performance statistics of the first call includes a percent of time speaking versus dead air time on the first call.

14. A method for providing captioned telephone service, the method comprising:
   initiating a first captioned telephone service call;
   creating, using an automated speech recognition captioner, captions based on words spoken by a first party to the first captioned telephone service call;
   displaying the captions to a second party to the first captioned telephone service call;
   measuring the accuracy of the captions with respect to the words spoken by the first party;
   in response to the accuracy of the captions being within predetermined accuracy range, continuing to create captions using automated speech recognition; and
   in response to the accuracy of the captions being outside of a predetermined accuracy range, creating captions for the remainder of the captioned telephone service call using a human captioner.

15. The method of claim 14, in which measuring the accuracy of the captions with respect to the words spoken by the first party further comprises:
   prompting the first party to speak a predetermined set of words; and
   measuring the accuracy of the captions with respect to the predetermined set of words spoken by the first party.

16. The method of claim 14, in which the automated speech recognition captioner is selected from a plurality of automated speech recognition captioners; and
   in which the measured accuracy of the captions generated by the automated speech recognition captioner stored in a database record associated with the associated with the first captioned telephone service call.

17. The method of claim 16, further comprising:
   initiating a second captioned telephone service call;
   selecting an automated speech recognition captioner for the second captioned telephone service call based on the accuracy
   creating, using the selected automated speech recognition captioner, captions based on words spoken by a first party to the captioned telephone service call;
   displaying the captions to a second party to the second captioned telephone service call.

18. A method for providing captioned telephone service, the method comprising:
   initiating a first captioned telephone service call;
   during the first captioned telephone service call, creating a first set of captions using a human captioner;
   simultaneous with creating the first set of captions using a human captioner, creating a second set of captions using an automated speech recognition captioner;
   comparing the first set of captions and the second set of captions using a scoring algorithm;
   determining whether the first set of captions is outside of a predetermined range of scores; and
   in response to the score of first set of captions being outside of a predetermined range of scores, setting an electronic flag indicative of the human captioner being in need of corrective action.

19. The method of claim 18, further comprising transmitting an electronic communication to a person responsible for initiating the corrective action.

20. The method of claim 18, in which the corrective action comprises providing additional training to the human captioner.

* * * * *